W. P. GANNON.
HAY RAKE AND LOADER.
APPLICATION FILED FEB. 2, 1911.
1,063,675.
Patented June 3, 1913.
4 SHEETS—SHEET 1.
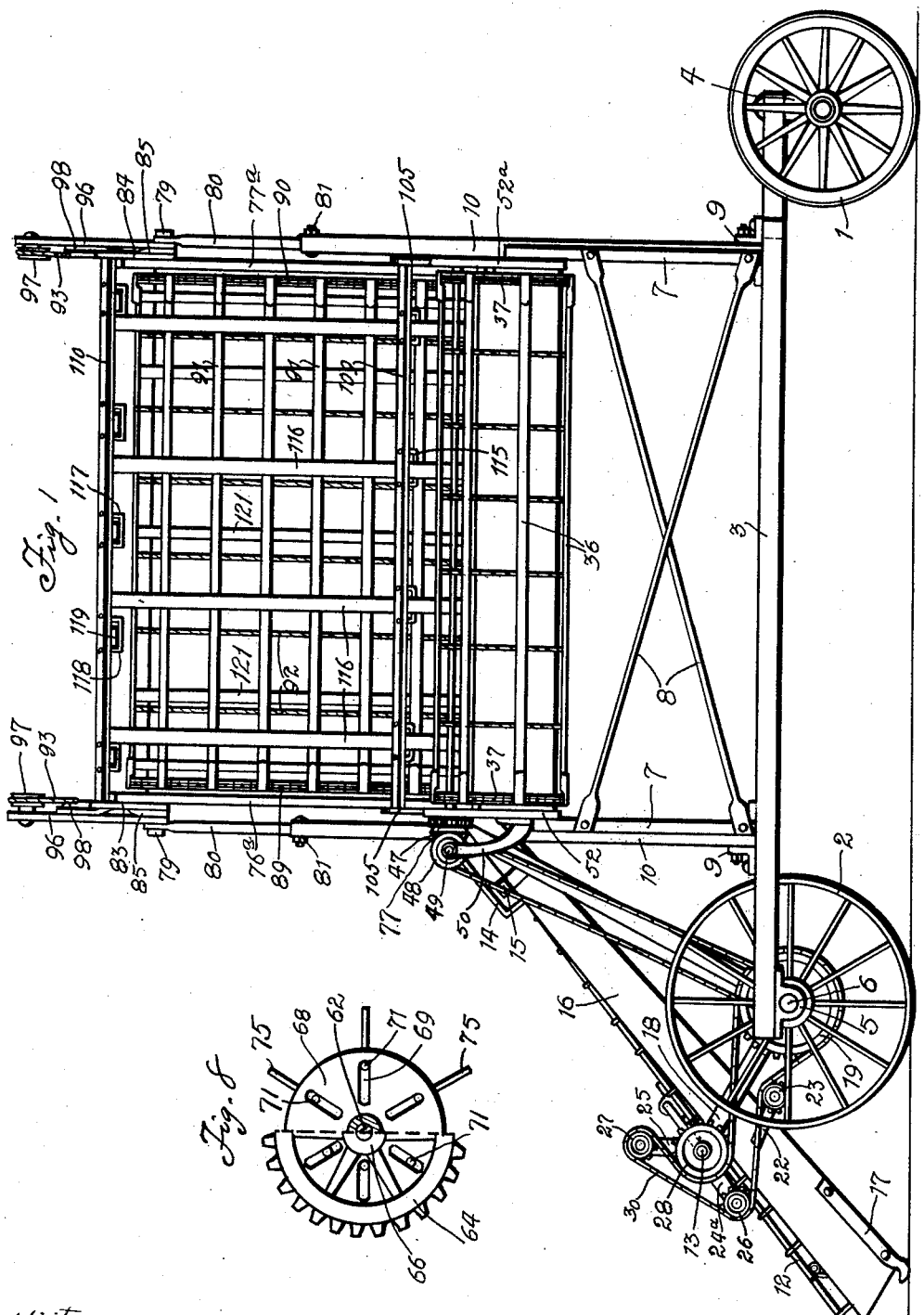

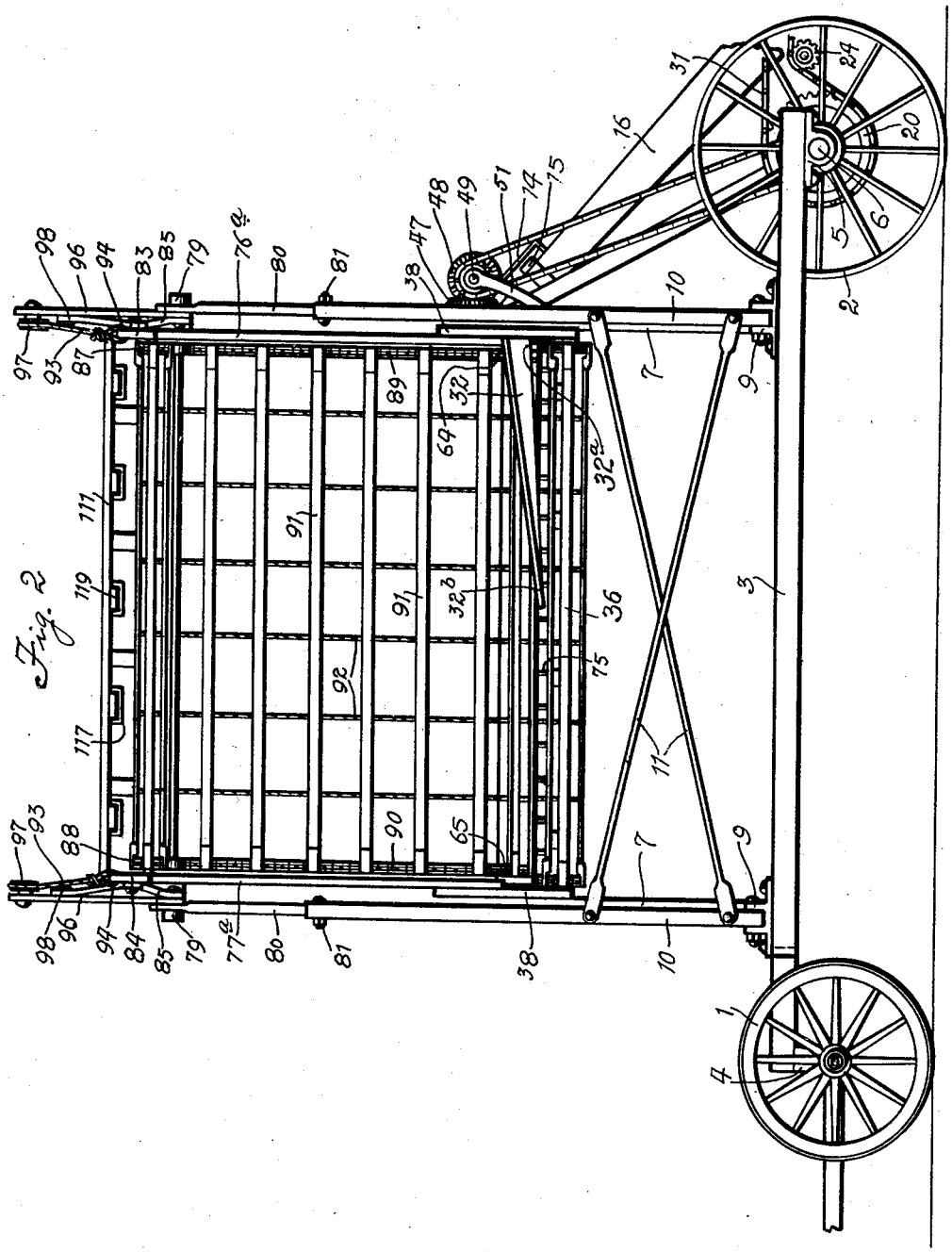

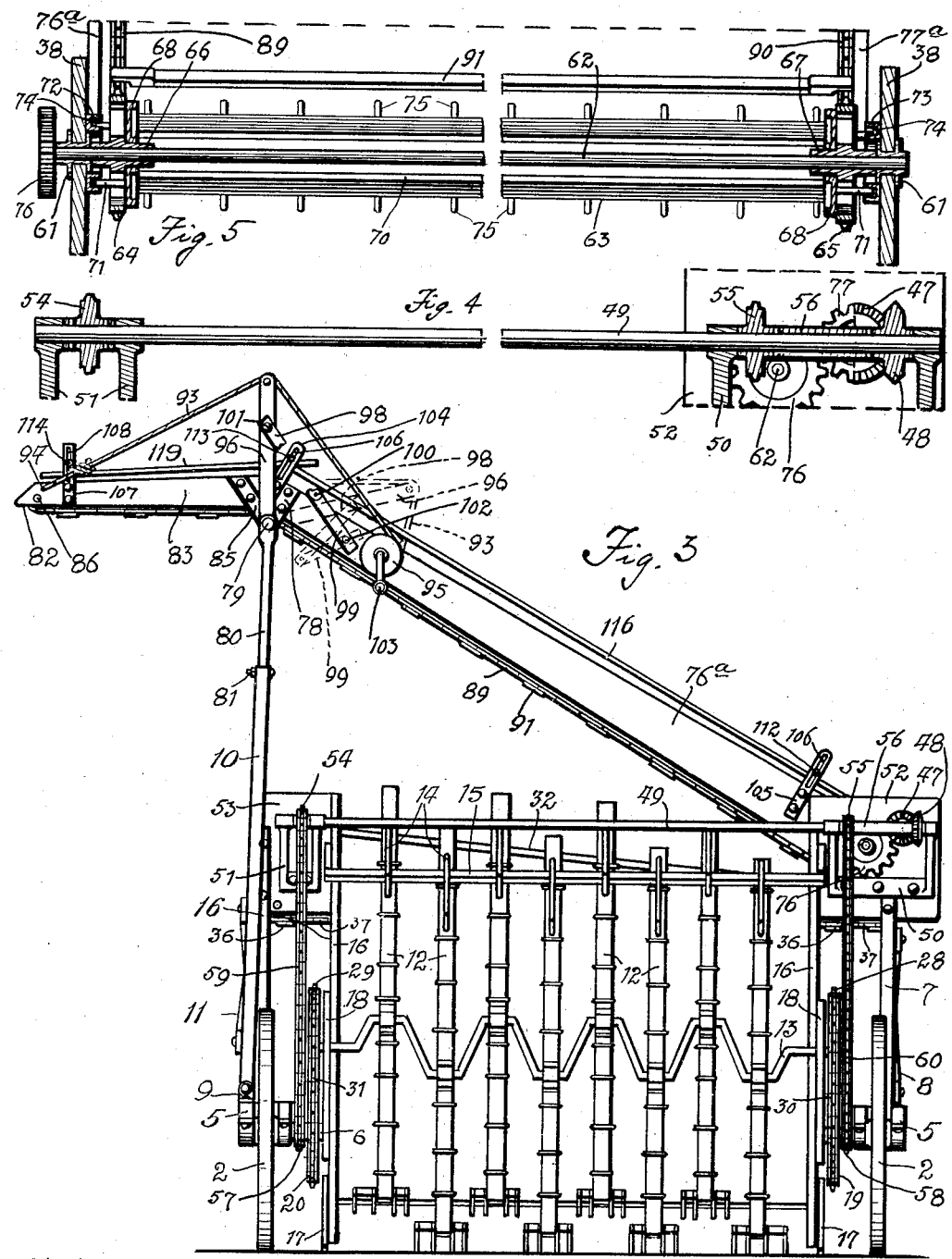

W. P. GANNON.
HAY RAKE AND LOADER.
APPLICATION FILED FEB. 2, 1911.
1,063,675.
Patented June 3, 1913.
4 SHEETS—SHEET 4.
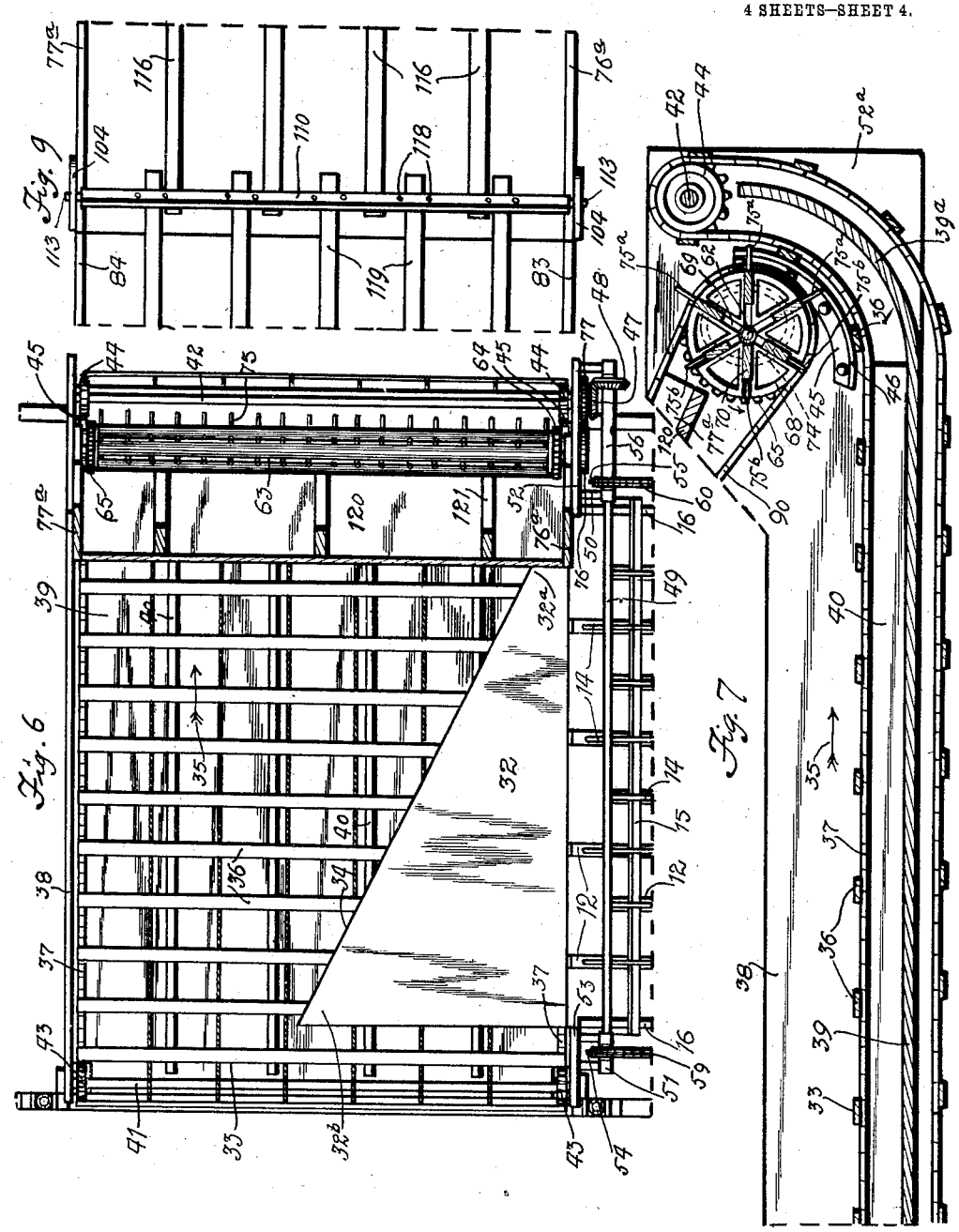

UNITED STATES PATENT OFFICE.

WILLIAM P. GANNON, OF VALERIA, IOWA.

HAY RAKE AND LOADER.

1,063,675.  Specification of Letters Patent.  Patented June 3, 1913.

Application filed February 2, 1911. Serial No. 606,269.

*To all whom it may concern:*

Be it known that I, WILLIAM P. GANNON, a citizen of the United States, and residing at Valeria, in the county of Jasper and State of Iowa, have invented a new and useful Hay Rake and Loader, of which the following is a specification.

My invention relates to combined hay-rakes and loaders adapted to lift the hay automatically from the ground on to a horizontal conveyer as the loader is driven over the field and to automatically transfer the hay from the horizontal conveyer to an elevating conveyer, from which it is discharged to the vehicle to be loaded.

One feature of novelty in my invention consists in the arrangement of the elevating conveyer with respect to the supporting frame-work of the loader. This conveyer extends upwardly across the frame-work from one side to the other and is operated in a direction opposite to the horizontal conveyer. This construction results in an evenly balanced frame-work and, furthermore, permits the vehicle which is being loaded to be driven in close proximity to the loader.

Another feature of novelty in my invention consists in the distributing board for the horizontal conveyer. That portion of the board which extends laterally across this conveyer is of substantially triangular shape, so that the free edge of the board is oblique to the direction of operation of the conveyer. The result of this novel construction is that the hay or other material passing over the distributing board is distributed with great evenness over the horizontal conveyer. Preferably the inner end of the distributing board is lower than the outer end, so that the hay will readily pass off on to the horizontal conveyer.

Another feature of novelty in my invention resides in a wind shield for the elevating conveyer, this wind-shield being so designed as to automatically adjust itself to the volume of hay which is being elevated.

The above and other features of novelty and advantages of my invention will become apparent from a detailed description of the accompanying drawings, in which—

Figure 1 shows one side of a hay-rake and loader constructed in accordance with my invention, Fig. 2 shows the opposite side of the hay rake and loader shown in Fig. 1, Fig. 3 is a rear elevational view of the hay rake and loader, Fig. 4 is a cross-sectional detailed view of the operating shaft and the gearing connected with the elevating conveyer for actuating the same, Fig. 5 is a cross-sectional view in detail of the toothed cylinder which forms the base portion of the elevating conveyer for automatically transferring the hay or other material from the horizontal conveyer to the elevating conveyer, Fig. 6 is a top plan view of the horizontal conveyer and distributing board, the lower portion of the frame-work and the elevating conveyer being also shown, Fig. 7 is a longitudinal cross-sectional view of the horizontal conveyer and the toothed cylinder mounted in the elevating conveyer, Fig. 8 is an end view in detail of the toothed cylinder of the elevating conveyer, certain parts being broken away for the sake of clearness, and Fig. 9 is a fragmental top plan view of the upper portion of the elevating conveyer showing the adjustable arrangement of the slats in the wind-shield at the point where the extended portion of the elevating conveyer is pivoted to the main body portion.

The hay rake and loader is mounted on front wheels 1 and rear wheels 2. The bed or body 3 is at its front end directly supported on the bolster 4 and at its rear end rests on bearing brackets 5 which are mounted on the rear axle 6. On one side of the bed 3 are the uprights 7 connected by the braces 8. On the opposite side of the bed are secured the brackets 9 in which are pivotally mounted the lower ends of the uprights 10, as best shown in Fig. 2. The cross-braces 11 connect the uprights 10 so as to form therewith a rigid frame-work for supporting the outer end of the elevating conveyer, as will more fully appear hereinafter.

At the rear of the loader is the rake-portion of my device. This rake-portion comprises a series of rake bars 12 of any approved construction and connected to the crank shaft 13 for reciprocatory movement. The upper ends of the rake-bars 12 are provided with looped brackets 14 through which passes the transverse guide-bar 15. The guide bar extends across the frame-work of the rake mechanism and is rigidly secured to the sides 16. The upper end of the rake-mechanism is suitably supported by the uprights at the rear of the loader, and the lower end is provided with metal legs or extensions 17, which rest upon the ground. The sides 16 are, at an intermediate point, provided each with a bracket 18, which is journaled at its inner or lower end on the rear axle 6. The upper ends of the brackets 18 extend beyond the sides 16 in order to form bearings for the crank shaft 13. A pair of gear wheels 19 and 20 are fixed upon the rear axle adjacent to the sides 16 of the rake mechanism, as shown in Fig. 3. Each of the sides 16 has secured thereto a rearwardly extending bracket 22, one of these being shown in Fig. 1 and the other being broken away, in Fig. 2. The brackets 22 carry at their free ends the pinions 23 and 24. To the arms 24$^a$ and 25 of the brackets 18 are journaled the pinions 26 and 27 respectively, as shown in Fig. 1. This arrangement is duplicated on the other side of the rake-mechanism, but has, for the sake of clearness, been omitted from Fig. 2. The crank shaft 13 extends at its ends beyond the bearing brackets 18 and has secured thereto the gear wheels 28 and 29, as best shown in Fig. 3. The flexible connection 30, preferably a sprocket chain, passes around the gear wheel 19, the pinion 23, the pinion 26, the pinion 27 and the gear wheel 28. A similar connection 31 passes around the same arrangement of gear wheels and pinions at the other side of the rake mechanism, in order to operatively connect the crank shaft 13 with the rear axle of the loader. As the the loader is driven over the hay-strewn ground, the reciprocated rake-bars 12 rake up the hay and raise it to the distributing board 32 which extends from the upper end of the rake mechanism laterally across the horizontal conveyer indicated as a whole by the reference numeral 33, as best shown in Fig. 6. The distributing board 32 is triangular in shape, the free edge 34 of the board converging toward the rear side of the horizontal conveyer in the direction in which the conveyer is operated. In Figs. 6 and 7 the direction of operation of the horizontal conveyer 13 is from left to right and is indicated by the arrows 35. The angle of convergence of the free edge 34 may, of course, be varied from that shown for the sake of illustration in Fig. 6 and will depend upon the width of the horizontal conveyer. It will be apparent that by this construction of distributing board the hay or other material fed to the board is distributed evenly over the horizontal conveyer 33, due to the fact that the free end of the board terminates at different distances from one side of the conveyer. Thus the hay which is fed to the board at the end 32$^a$ is deposited on to the horizontal conveyer near one side thereof, while the hay which passes off the distributing board at the outer end 32$^b$ is deposited beyond the center of the conveyer. In order that the hay may easily and readily pass off the distributing board, the latter is tilted downwardly in the direction of operation of the horizontal conveyer, that is to say, the small end 32$^a$ is nearest the conveyer, as shown in Fig. 2.

The movable portion of the horizontal conveyer 33 comprises the transverse slats 36 connected at their ends to sprocket chains or other flexible connections 37. The sides 38 of the horizontal conveyer 33 are connected together by the bottom 39, upon opposite sides of which run the sprocket chains 37, as best shown in Fig. 7. The bottom 39 is provided with a series of longitudinally arranged beams 40 which form supports for the slats 36 when the latter pass over the bottom 39. In one end of the partitions 37 is mounted the shaft 41 and in the other end the shaft 42. The shaft 41 carries the sprocket wheels 43, while the shaft 42 is provided with the sprocket wheels 44, as shown in Fig. 6. The pairs of sprocket wheels 43 and 44 are arranged in longitudinal alinement for receiving the sprocket chains 37. As best shown in Fig. 7, the shaft 42 is mounted above the horizontal plane of operation of the conveyer, and, in order to cause proper elevation of the slats 36 as they leave the supporting beams 40, I provide a pair of curved brackets 45 secured to the sides 38. The brackets 45 are substantially L-shaped in cross-section and have inwardly extending flanges 46 under which the ends of the conveyer slats 36 pass. The bottom 39 is curved upwardly at 39$^a$ so as to conform to the curvature of the brackets 45. The object of thus elevating the front end of the horizontal conveyer in a curved position is to permit the automatic transfer of the hay on to the elevating conveyer, as will presently appear in detail.

The horizontal conveyer 33 is operated from the rear axle 6 by means of the following connections: The shaft 42 has, at one end, fixed thereto the bevel gear 47, which is in mesh with the bevel gear 48 secured to one end of the shaft 49. The latter is journaled in brackets 50 and 51 mounted on the plates 52 and 53 respectively, as best shown in Fig. 3. The plates 52 and 53 are rigidly supported by the upright frame-work of the loader. Fixed upon the shaft 49, between the arms of the bracket 51, is the sprocket wheel 54. A similar sprocket wheel 55 is carried by the sleeve member 56 rigidly secured upon the shaft 49 between the arms of the bracket 50. A driving sprocket wheel 57 is rigidly secured upon the rear axle 6 in alinement with the sprocket wheel 54, as shown in Fig. 3. A similar sprocket wheel 58 is fixed on the rear axle 6 in alinement with the sprocket wheel 55. A sprocket chain 59, or other flexible driving means, connects the sprocket wheels 54 and 57, while the opposite pair of sprocket wheels 55 and 58 is connected together by the sprocket chain 60. It will thus be seen that the motion of the rear axle 6 is imparted to the shaft 42 of the horizontal conveyer to operate the latter in the direction indicated by the arrows 35 as the loader is advanced.

Referring to Fig. 5 it will be seen that the side pieces 38 are provided with bearings 61 in which is rotatably mounted the shaft 62 of the toothed cylinder indicated as a whole by 63. Near each end of the shaft 62 are fixed the sprocket wheels 64 and 65 provided with hub portions 66 and 67, respectively, on which are mounted the disks 68, as best shown in Fig. 8. The disks 68 are provided with a series of radial slots 69. In the particular example illustrated there are six of these slots. A series of slats or bars 70 are at their ends provided with pins 71 which extend through the slots 69. A pair of cam plates 72 and 73 are fixed to the side pieces 38, the inner portion of the bearings 61 resting within the openings of the cam plates. Each of these cam plates is provided with an eccentric groove 74. The configuration of the eccentric groove is best indicated by the dotted lines in Fig. 7. The pins 71 of the slats 70 extend between the spokes of the sprocket wheels 64 and 65 into the cam grooves 74. In this way the slats 70 are supported by the cam plates 72 and 73 and the radial position of the slats is governed by the shape of the cam groove 74. The slats 70 are provided with teeth 75, the purpose of which is to elevate the hay from the horizontal conveyer and discharge it to the elevating conveyer of which the toothed cylinder forms a part. The shaft 62 extends at one end beyond the bearing 61 and is provided with a pinion 76 which is permanently in mesh with the pinion 77 rigidly mounted on the shaft 42. The gear connections whereby the rotation of the shaft 42 is communicated from the rear axle 6 of the loader has already been described in connection with the horizontal conveyer. Rotation of the toothed cylinder, and therefore of the elevating conveyer, takes place simultaneously with the operation of the horizontal conveyer when the loader is driven over the field. The form of the cam grooves 74 is such that the teeth 75 are projected outwardly to grasp the hay on the horizontal conveyer and deliver it onto the apron of the vertical conveyer, after which delivery the teeth are drawn inwardly out of engagement with the hay in order to permit the same to be carried upwardly on the apron. This operation of the teeth 75 is best shown in Fig. 7 from which it will be seen that the three rows of teeth $75^a$ are thrust outwardly, while the three rows of teeth $75^b$ are drawn inwardly. As the cylinder continues to rotate in the direction indicated by the arrow in Fig. 7, the upper row of teeth $75^a$ will be drawn in while the lower row of teeth $75^b$ will be thrown out into grasping position. This alternate outward and inward movement of the teeth on the cylinder 63 causes the automatic transfer of the hay from the horizontal conveyer to the elevating conveyer.

The main frame work of the elevating conveyer comprises the side pieces $76^a$ and $77^a$ which are at their lower ends mounted between the plates 52 and $52^a$, as shown in Fig. 1. The plate $52^a$ forms in the present instance an integral part of one of the sides 38 of the horizontal conveyer, as best shown in Fig. 7. The upper ends of the side pieces $76^a$ and $77^a$ are provided with arms 78, one of which is shown in Fig. 3. The arms 78 are at their free ends pivoted to the lugs or pins 79 carried at the upper ends of the upright arms 80. The latter are rigidly connected at their lower ends with the pivotally supported uprights 10 by means of bolts or other fastening devices 81. The elevating conveyer terminates at its upper end in a horizontal extension indicated as a whole by 82. The side pieces 83 and 84 of this extension are at their rear ends provided with downwardly extending arms 85 which are pivotally connected to the pins 79. Near the free ends of the side pieces 83 and 84 is journaled the shaft 86 provided with the sprocket wheels 87 and 88 which are in alinement with the sprocket wheels 64 and 65, respectively, of the toothed cylinder 70. A sprocket chain 89 passes over the sprocket wheels 64 and 87, while a similar sprocket chain 90 passes over the sprocket wheels 65 and 88. To the sprocket chains 89 and 90 are secured the transverse slats 91 which constitute the apron of the elevating conveyer. Ropes 92 are secured at intervals to the slats 91 so as to form with said slats a sort of lattice work for holding the hay. In order to prevent dropping of the lower portion of the apron the pins 79 extend inwardly far enough to engage the sprocket chains 89 and 90. The horizontal extension 82 of the elevating conveyer is maintained in operative position by the ropes or cables 93 which are secured at one end to the sides 83 and 84 at the point 94 and at the other end wound up on the drums 95, one of which is shown in Fig. 3. A pair of arms 96 are pivoted upon the pins 79 and are at the outer end provided with the guide sheaves or pulleys 97 over which the ropes or cables 93 are trained. Each arm 96 is held in upright position by a pair of toggle levers 98 and 99 connected together at 100. The levers 98 are pivotally connected at 101 to the arms 96 and the companion levers 99 are pivoted to the side of the elevating conveyer at the point 102. The drums 95 are operated by means of handles 103. When it is desired to lower the extension 83 (as when the machine is put in the building at the close of the day's work), the operator unwinds the cables 93 from the drums 95 and breaks the toggle joints between the levers 89 and 90, whereupon the arms 96 and the toggle levers assume the position indicated in dotted lines, while the extension 82 hangs in a vertical position.

It will be apparent that changes and modifications in the mechanism for raising and lowering the extension 82 will occur to those skilled in the art and I do not, therefore, wish to be limited to the precise mechanism shown.

From the above description of the elevating conveyer it will be clearly understood that as the hay or other material is carried forwardly on the horizontal conveyer, it is grasped by the toothed cylinder and automatically transferred to the apron of the elevating conveyer by which it is carried upwardly on to the extension 82 and from there discharged into the wagon underneath. It will be observed that the elevating conveyer extends from one side of the loader to the other; this permits the wagon which is to be loaded with the hay to be driven alongside the loader. It will also be observed that the directions of operation of the two conveyers are opposite, that is to say the horizontal conveyer carries the hay horizontally across the loader from left to right (as viewed in Fig. 3), while the elevating conveyer carries the hay upwardly across the loader from right to left (as viewed in Fig. 3).

In order to shield the hay while on the elevating conveyer against the action of the wind, I have provided this conveyer with a wind shield which is so constructed that it rests upon the hay by gravity and automatically adjusts itself to the volume of hay. Each of the sides 76ª and 77ª is provided with an upper bracket 104 and a lower bracket 105. These brackets have slots 106. The side pieces 83 and 84 of the horizontal extension are each provided near the outer end with an arm 107 having a slot 108. The wind shield comprises a lower cross bar 109, an intermediate cross bar 110 and an upper cross bar 111. These cross bars are at their outer ends provided with pins 112, 113 and 114, respectively. The pins 112 of the lower cross bar 109 work in the slots of the brackets 105. The pins 113 of the intermediate cross bar 110 work in the slots of the brackets 104, while the pins 114 of the upper cross bar 111 work in the slots of the brackets 107. The cross bar 109 is provided with stirrups 115 through which pass the lower ends of the slats 116. The upper ends of these slats are secured to the intermediate cross bar 110. The upper cross bar 111 is provided with stirrups 117 and the intermediate cross bar 110 is provided with stirrups 118, which are in alinement with the stirrups 117. Through each pair of alined stirrups 117 and 118 passes a slat 119.

It will thus be seen that the slatted wind shield comprises two portions which are pivotally connected near the point of connection between the extension 82 and the main body of the elevating conveyer, so that the slats 119 are moved with respect to the slats 116 when the extension 82 is raised and lowered. By virtue of the slotted connection between the elevating conveyer and the wind shield, the latter is free to adjust itself automatically to the volume of hay that is being carried over the conveyer. Since the weight of the wind shield is considerably small, there is no appreciable friction due to its weight upon the hay and the proper operation of the elevating conveyer is not interfered with.

The bottom 120 of the elevating conveyer, like the bottom 39 of the horizontal conveyer, is provided with beams 121 to support the slats 91.

While I have herein shown and described only part of the embodiment of my invention it is to be understood that various changes and modifications will occur to those skilled in the art without departing from the scope of the invention as defined in the appended claims. It is further apparent that certain features of my invention may be used without certain other features.

Having thus described my invention what I claim as new and desire to secure by Letters Patent of the United States is:—

1. In a loader of the class described, the combination of a supporting frame-work, a horizontal conveyer extending transversely of said frame-work, means for delivering the material to said horizontal conveyer, an elevating conveyer extending across said frame-work from one side thereof directly over said horizontal conveyer and adapted to operate in a direction opposite to said horizontal conveyer, and means carried by said framework for delivering the material from said horizontal conveyer to said elevating conveyer.

2. In a loader of the class described, the combination of a wheeled frame-work, a horizontal conveyer extending transversely across said frame-work, an elevating conveyer extending transversely across said frame-work directly over said horizontal conveyer, and means carried by said framework for delivering the material from said horizontal conveyer to said elevating conveyer, whereby the vehicle to be loaded from said conveyer can be driven at the side of said frame-work substantially as and for the purpose described.

3. In a loader of the class described, the combination of a wheeled frame-work, a horizontal conveyer extending transversely of said frame-work, an elevating conveyer extending across said frame-work from one side thereof directly over said horizontal conveyer and adapted to operate in a direction opposite to said horizontal conveyer, and means for simultaneously operating both of said conveyers, and means carried by said frame-work for delivering the material from said horizontal conveyer to said elevating conveyer.

4. In a loader of the class described, the combination of a frame-work provided with a horizontal conveyer, an elevator conveyer arranged in vertical alinement, and supported in said frame-work so that the lower end of said elevator conveyer terminates at a point above and directly over said horizontal conveyer, means mounted on said frame-work for delivering the material from the horizontal conveyer to said elevating conveyer, and means for operating said conveyers in opposite directions, whereby the material to be loaded is carried to one side of the frame-work on the horizontal conveyer and delivered at the other side of the frame-work by the elevating conveyer.

5. In a loader of the class described, the combination of a frame-work, a horizontal conveyer extending transversely across said frame-work, an elevating conveyer extending transversely across said frame-work directly over said horizontal conveyer and adapted to operate in opposite directions to said horizontal conveyer, a toothed cylinder rotatably mounted on said frame and adapted to engage the material on the horizontal conveyer for delivering it to said elevating conveyer and means for operating said conveyers and cylinders.

6. In a loader of the class described, the combination with a horizontal conveyer, of an elevating conveyer extending over said horizontal conveyer to receive the material therefrom and carry it in the opposite direction, said elevating conveyer having a cylinder provided with automatically adjustable teeth designed to extend outwardly to engage the material on the horizontal conveyer and deliver it to the elevating conveyer, and means mounted in said cylinder for drawing said teeth inwardly after delivering the material to the elevating conveyer.

7. In a loader of the class described, the combination with a horizontal conveyer, of an elevating conveyer extending over said horizontal conveyer to receive the material therefrom and carry it in the opposite direction, said elevating conveyer having a toothed cylinder so arranged with respect to said horizontal conveyer as to engage the material on the horizontal conveyer and automatically deliver it to the elevating conveyer, radially adjustable bars on which the teeth of the cylinder are mounted, pins projecting from the ends of each bar, and cam grooves in which said pins operate, the shape of said cam grooves being such that the teeth are projected outwardly to engage the material on the horizontal conveyer and are drawn inwardly after delivering the material to the elevating conveyer.

In witness whereof, I hereunto subscribe my name this 16th day of January, A. D. 1911.

WILLIAM P. GANNON.

Witnesses:
    CLARENCE J. LOFTUS,
    ELIZABETH SKAHILL.